(12) United States Patent
Bennett (10) Patent No.: US 8,967,529 B1
(45) Date of Patent: Mar. 3, 2015

(54) BATTERY-STRUCTURE

(75) Inventor: Barton E. Bennett, Mishawaka, IN (US)

(73) Assignee: Odyssian Technology, LLC, South Bend, IN (US)

( * ) Notice: Subject to any disclaimer, the term of this patent is extended or adjusted under 35 U.S.C. 154(b) by 140 days.

(21) Appl. No.: 13/422,204

(22) Filed: Mar. 16, 2012

Related U.S. Application Data (60) Provisional application No. 61/465,909, filed on Mar. 25, 2011.

(51) Int. Cl.
*B64D 27/24* (2006.01)

(52) U.S. Cl.
USPC .......................................... 244/53 R; 446/57

(58) Field of Classification Search
USPC .............. 244/53 R, 87, 124, 190; 446/36–45, 446/57–58
See application file for complete search history.

(56) References Cited

U.S. PATENT DOCUMENTS

| | | | | |
|---|---|---|---|---|
| 3,391,752 A | * | 7/1968 | Albright | 180/65.1 |
| 3,640,492 A | * | 2/1972 | Star | 244/124 |
| 3,777,395 A | * | 12/1973 | Chang | 446/58 |
| 3,827,181 A | * | 8/1974 | Mabuchi | 446/57 |
| 3,937,424 A | * | 2/1976 | Meier et al. | 244/53 R |
| 5,156,225 A | * | 10/1992 | Murrin | 180/65.1 |
| 6,612,893 B2 | * | 9/2003 | Rehkemper et al. | 446/34 |
| 6,769,949 B2 | * | 8/2004 | Kim et al. | 446/35 |
| 6,971,941 B2 | * | 12/2005 | Kaneko et al. | 446/269 |
| 7,377,832 B2 | * | 5/2008 | Chamberlain | 446/57 |
| 7,811,150 B2 | * | 10/2010 | Amireh et al. | 446/58 |
| 7,918,707 B2 | * | 4/2011 | Amireh et al. | 446/58 |
| 8,133,089 B2 | * | 3/2012 | Amireh et al. | 446/58 |
| 8,202,137 B2 | * | 6/2012 | Amireh et al. | 446/34 |
| 8,511,613 B2 | * | 8/2013 | Droney | 244/137.4 |
| 2004/0195438 A1 | * | 10/2004 | Chamberlain | 244/65 |
| 2007/0259595 A1 | * | 11/2007 | Amireh et al. | 446/57 |
| 2010/0000816 A1 | * | 1/2010 | Okada | 180/68.5 |

* cited by examiner

*Primary Examiner* — Philip J Bonzell
*Assistant Examiner* — Michael Kreiner
(74) *Attorney, Agent, or Firm* — Faegre Baker Daniels LLP (57) ABSTRACT

A battery-structure that may be located at least partially in the wings of an aircraft. The battery-structure forms a portion of the structural support of the wings and includes a plurality of battery receiving compartments; and a plurality of batteries located in the battery-structure. The batteries are configured to fit snugly within the battery receiving compartments, thereby increasing the rigidity of the battery-structure and the wings. The structural constituent of the battery-structure may be made from a carbon or graphite reinforced composite material or from a fiberglass composite material. The battery-structure may include a top panel, a bottom panel, a pair of side panels, and a plurality of web members. The panels and the web members may define the battery receiving compartments. The batteries can be received snugly between the web members to reinforce the rigidity and/or strength of the battery-structure.

8 Claims, 9 Drawing Sheets

BATTERY-STRUCTURE

This application claims the benefit of U.S. Provisional Patent Application Ser. No. 61/465,909 filed Mar. 25, 2011, the complete disclosure of which is hereby expressly incorporated by reference.

BACKGROUND OF THE INVENTION

Battery-powered vehicles have been known for many years, and many different types, varieties and designs have been developed. One type of vehicle that may be battery powered is an aircraft, and in particular, a remote-controlled airplane. It is known to house battery packs in the fuselage of such an airplane; however, such battery packs add considerable weight to the airplane without providing any additional structural integrity, which could thereby be used to reduce the weight of structural components. In one embodiment, the present invention relates to the implementation of structurally integrated commercially off-the-shelf battery cells, or specially designed battery cells into structural components of a remote controlled aircraft. Such a structural system, which may be referred to as battery-structure, may improve vehicle performance or utility that results from synergistic interaction or cooperative action of the otherwise separate battery and structural constituents.

The battery-structure may be integrated into the wings and/or tail section of a battery powered aircraft and may account for up to half of its weight, and may include hybrid battery-structure systems having both high energy battery-structure and high power battery-structure that together may have a profound impact on improving battery-structure energy efficiency and performance. Designs employed may provide greater energy capacity, lighter weight, improved space utilization, and improved weight distribution to provide longer flights, greater range, small size, larger payload volume capacity, and improved flight stability or flight handling characteristics.

Accordingly, it is an object of the present invention to provide battery-structures that improve the performance of the component or system in which they are used. In particular, an object of the invention is to provide battery-structures that can be used in ground, air, or space vehicles and which offer improvement in bending stiffness, reduction in weight, reduction in occupied space, improvement in weight distribution, and/or increase in payload stowage volume over what would otherwise occur if the battery and structure constituents were separate and not integrated.

BRIEF SUMMARY OF THE INVENTION

In one embodiment of the invention, an aircraft is provided that includes a fuselage, wings, and a battery-structure located at least partially in the wings. The battery-structure forms a portion of the structural support of the wings and includes a plurality of battery receiving compartments; and a plurality of batteries located in the battery-structure. The batteries are configured to fit snugly within the battery receiving compartments, thereby increasing the rigidity of the battery-structure and the wings, over what would otherwise occur if the battery and structure were separate.

The battery-structure may be formed from a carbon or graphite material or from a fiberglass material. The battery-structure may include a top panel, a bottom panel, a pair of side panels, and a plurality of web members. The panels and the web members may define the battery receiving compartments. The battery receiving compartments can have a rectangular configuration, and the batteries can be received snugly between the web members to provide support and to prevent bending of the webs at otherwise lower bending forces; thus resulting in improved rigidity and/or strength of the battery-structure. The batteries may be bonded to the surrounding structural materials; much like a structural foam core material would be bonded to surrounding composite or metallic material in a conventional sandwich panel structure.

The aircraft may include a plurality of stacked rows of battery receiving compartments and an intermediate panel between each row. The batteries can be prismatic batteries.

The aircraft may further include mounting clips mounted on the batteries and receptacles mounted in the receiving compartments for interlocking with the mounting clips. The battery-structure may extend parallel to and be contained within the wings or may extend parallel to the fuselage.

The aircraft may further include a tail structure and a second battery-structure located in the tail structure. The tail structure may have a trapezoidal configuration.

In another embodiment of the invention, a battery-structure is provided that is configured to give structural support to a component in which it is mounted. The battery-structure may have a plurality of battery receiving compartments; and a plurality of batteries located in the battery-structure, wherein the batteries are sized and configured to fit within respective battery receiving compartments and further configured to provide structural support and stiffness to the compartments when the battery-structure is subjected to an external stress.

The battery-structure may be formed from materials including, but not limited to, a carbon, graphite, or fiberglass material. In one embodiment, it includes a top panel, a bottom panel, a pair of side panels, and a plurality of web members. The panels and the web members define the battery receiving compartments. The battery receiving compartments can have a rectangular configuration, and the batteries are received snugly between the members to reinforce the rigidity of the battery-structure.

The battery-structure may also include a plurality of stacked rows of the battery receiving compartments and an intermediate panel between each row. The batteries can be prismatic batteries. The battery-structure may further include mounting clips attached on the battery and interlocking portions mounted in the receiving compartments for interlocking with the mounting clips.

In yet another embodiment of the invention, a method for mounting batteries in a component is provided that includes the steps of providing a battery-structure; mounting the battery-structure to the component; providing a plurality of battery receiving compartments in the battery-structure; mounting a plurality of batteries in the battery receiving compartments, wherein the batteries fit tightly within the battery receiving compartments; subjecting the battery-structure to an external force; and the batteries providing a resistance to deformation of the battery structure and the battery receiving compartments.

In one embodiment of the method of mounting batteries in the component, the component may be a wing of an aircraft. The method of mounting batteries in the component may also include the steps of providing a top panel, a bottom panel, a pair of side panels, and a plurality of web members on the battery-structure, and wherein the panels and the web members define the battery receiving compartments.

The battery receiving compartments may have a rectangular configuration, and the batteries are received tightly between the web members to reinforce the rigidity of the battery structure.

The method of mounting batteries in the component may also include the step of providing a plurality of stacked rows of battery receiving compartments and an intermediate panel between each row. Mounting clips can be attached to the batteries and interlocking receptacles can be provided on the receiving compartments. The battery-structure can be mounted within the wings of the aircraft so as to extend parallel to the wings.

The method of mounting batteries in the component may further include a tail structure and a second battery structure located in the tail structure. The tail structure may have a trapezoidal configuration.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Figure 1:
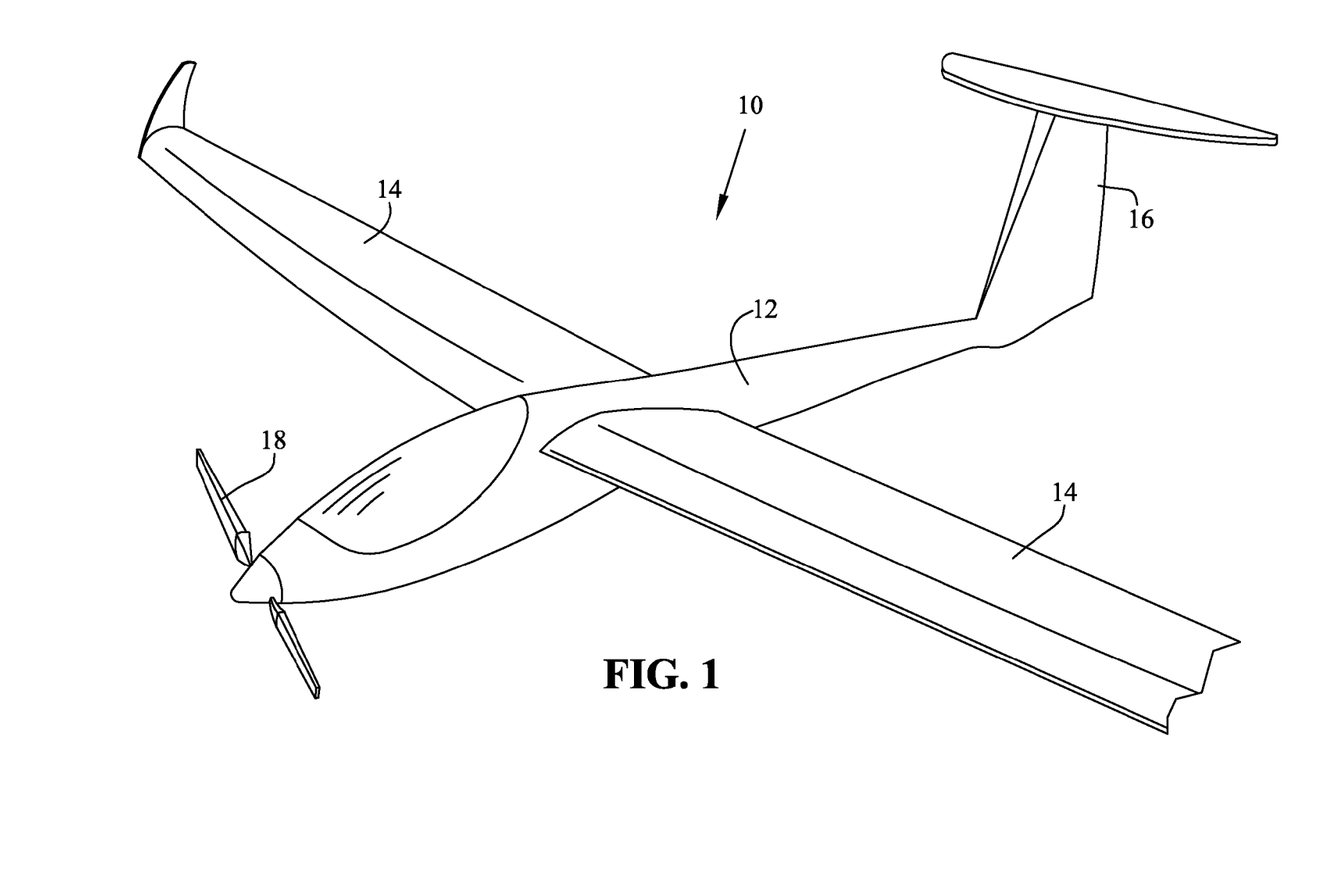
FIG. 1 is a perspective view of an aircraft containing a battery-structure in wings thereof.

Referring now to FIG. 1, a vehicle is shown that in the present embodiment is an aircraft, and in particular, an electrical/battery powered airplane 10. Airplane 10 includes a fuselage 12, a pair of wings 14, a tail section 16, and a propeller 18, as is well known in the art. Airplane 10 is configured to have battery-structure in wings 14 that provides a primary or secondary source of power to driver propeller 18 and that provides structural support to the wings 14.

Referring now to FIGS. 2-5, one embodiment of a battery-structure suitable for mounting in and aligned parallel to wings 14 is shown, generally designated as 20. Battery-structure 20 includes a top panel 22, a bottom panel 24, side panels 26, and a plurality of webs 28 extending between top panel 22 and bottom panel 24 and parallel to side panels 26. The panels 22, 24, and 26 and webs 28 may be made from any suitable material that preferably provides the characteristics of being lightweight, yet high strength. Suitable materials include, but are not limited to, carbon, Aramid, and/or glass fiber reinforced polymer composite material.

The battery-structure 20 also includes a plurality of batteries 30. Any suitable battery known in the art may be used, such as a prismatic battery or prismatic cells. In particular, prismatic lithium-polymer batteries may be utilized in battery-structure 20. Batteries 30 are mounted in compartments 32 (see FIGS. 4 and 5). Batteries 30 are mounted snugly or with a tight fit in compartments 32 for structural strength considerations as discussed more fully below. In addition, a filler or adhesive material (not shown) may be used to more fully assure the compartments 32 are filled tightly and/or maintaining the batteries in the battery-structure.

Figures 2, 3, 3A:
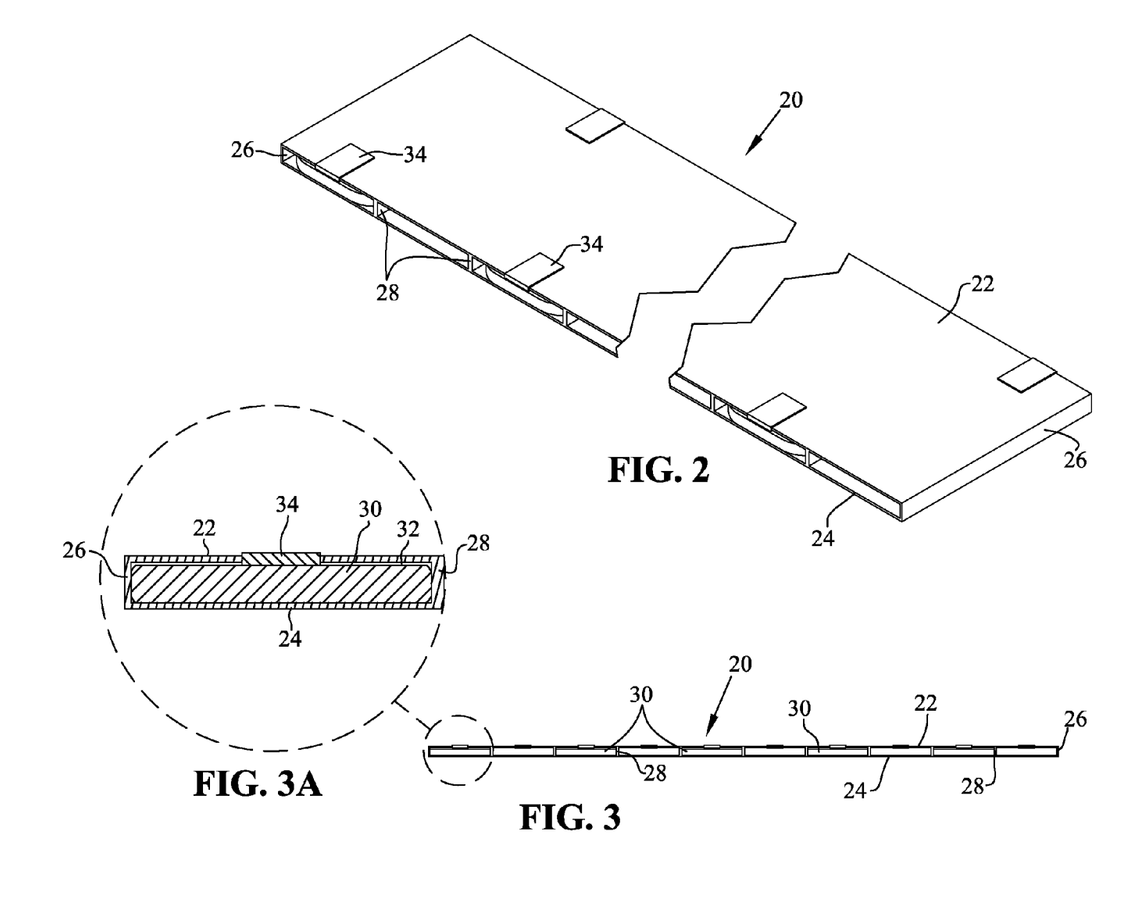
FIG. 2 is a perspective view of one embodiment of the battery-structure.
FIG. 3 is a front view of the battery-structure of FIG. 2.
FIG. 3A is an enlarged view of the battery-structure of FIG. 3 in the area indicated.
Figure 4:
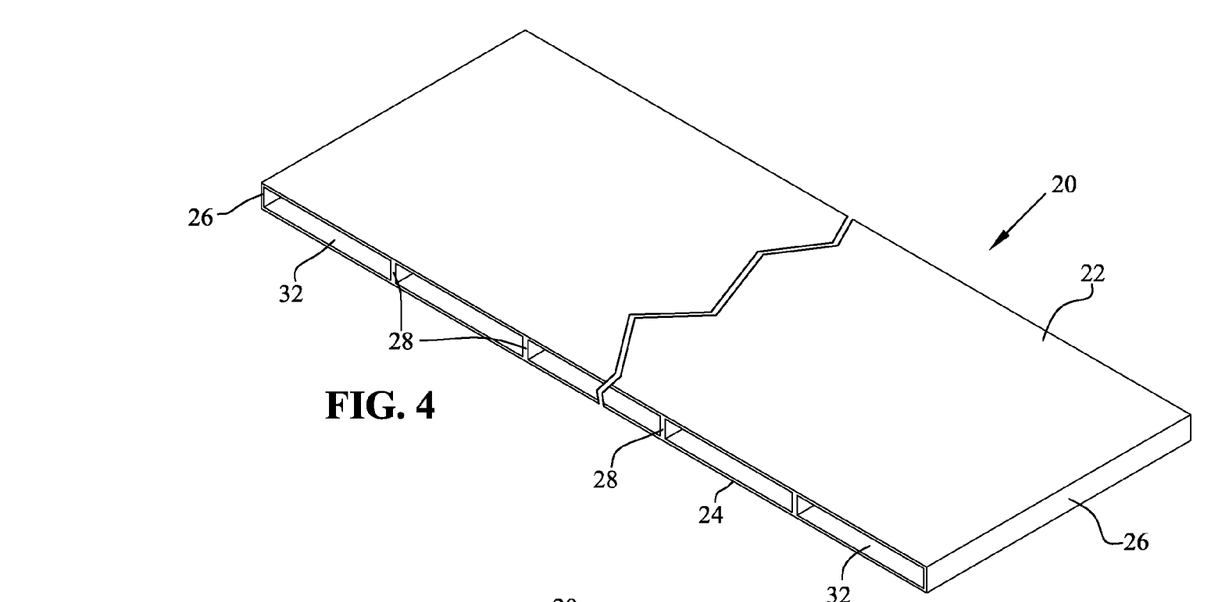
FIG. 4 is a perspective view of the battery-structure of FIG. 2 with the batteries removed.
Figure 5:
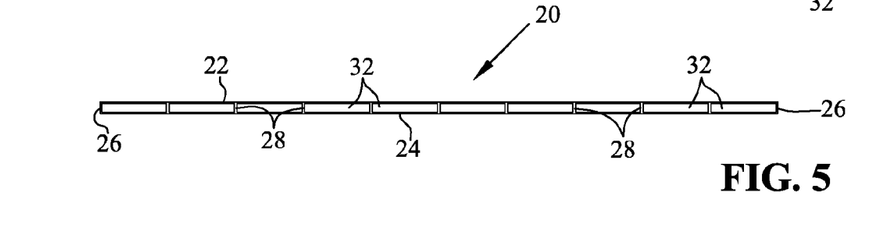
FIG. 5 is a front view of the battery-structure of FIG. 4 with the batteries removed.

Battery-structure 20 also includes electrical leads or contacts 34 and interconnecting electrical conductor (not shown), which may be made from a wire or foil to connect the batteries to the electrical system of aircraft 10. As shown, battery compartments 32 are open at both ends and contacts 34 are placed at alternate ends from compartment to compartment.

Figure 6:
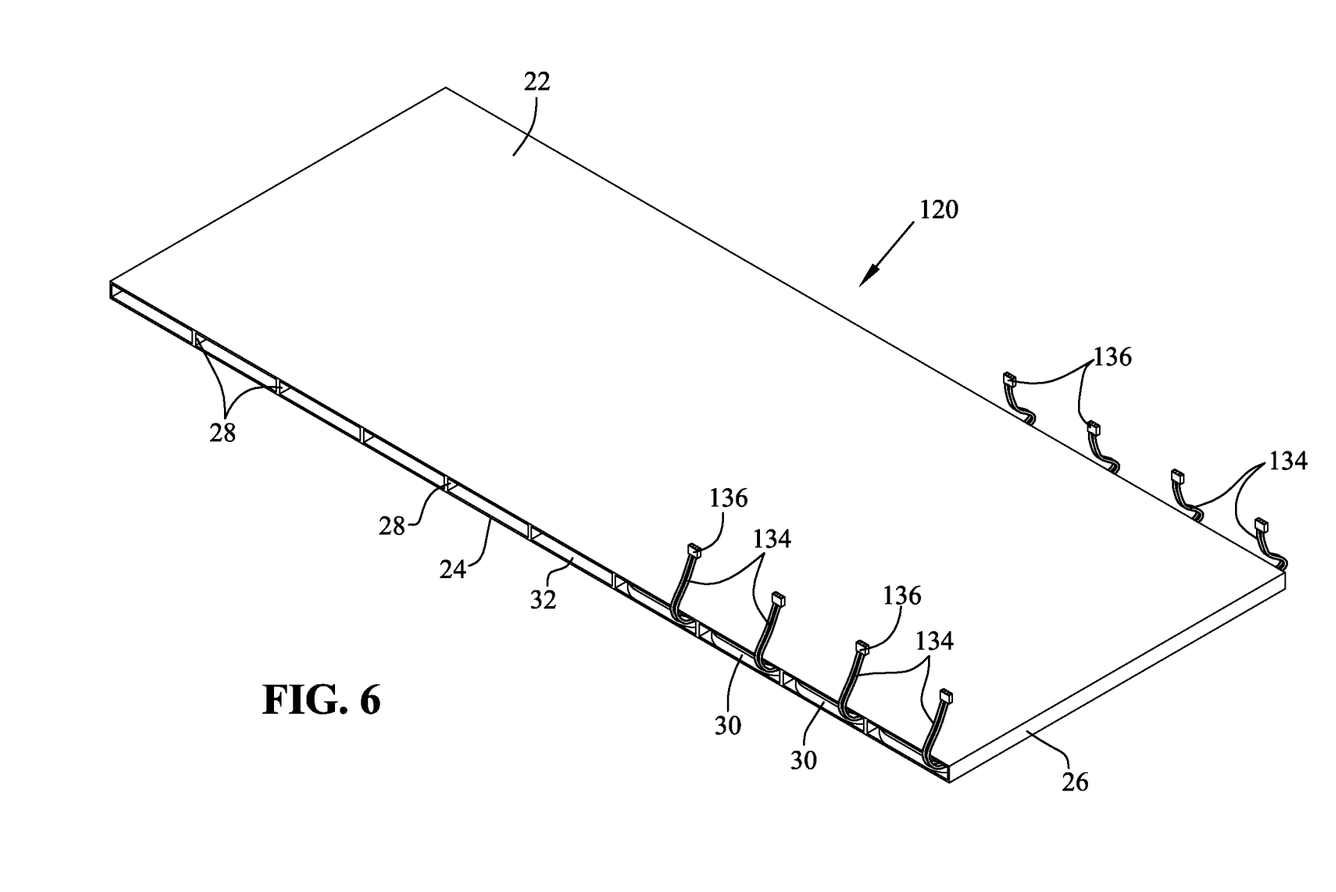
FIG. 6 is a perspective view of an alternate embodiment battery-structure.
Figures 7, 7A, 8, 8A:
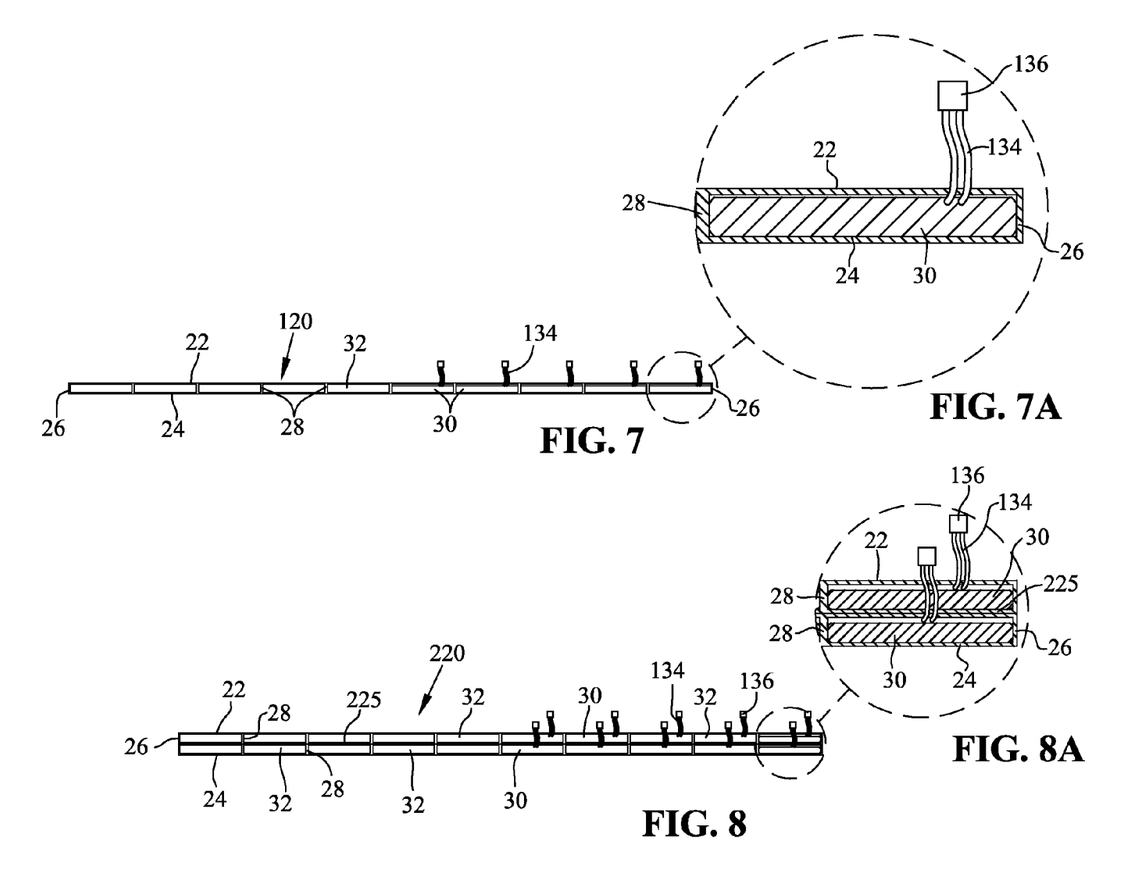
FIG. 7 is a front view of the battery-structure of FIG. 6.
FIG. 7A is an enlarged view of the battery-structure of FIG. 7 in the area indicated.
FIG. 8 is another alternate embodiment of a battery-structure similar to that of FIGS. 6 and 7 but includes multiple stacked rows of battery compartments.
FIG. 8A is an enlarged view of the battery-structure of FIG. 8 in the area indicated.

Referring now to FIGS. 6 and 7, an alternate embodiment battery-structure 120 is shown that is similar to battery-structure 20 except that in the embodiment presented, it is wider to allow two batteries (or more) to be contained into each battery compartment 32. In FIGS. 6 and 7 only a portion of compartments 32 are shown containing batteries; however, this is for clarification (to show the compartments in an empty and filled state), and it should be realized that all of the compartments 32 may be filled with batteries for maximum structural stability and storage of electrical power, or as many compartments may be filled as necessary for the specific design criteria. If any compartments do not contain batteries, a lightweight structural core material, such as a rigid foam or honeycomb core, can be used to maintain structural integrity and stiffness of the battery-structure.

Battery-structure 120 includes alternate embodiment electrical leads 134, which may be connected directly to batteries 30, or alternately, may be connected to contacts (not shown) internal to battery compartments 32. Electrical connectors 136 are attached to electrical leads 134 for providing an electrical connection to the electric power system of aircraft 10.

Now referring to FIG. 8, another alternate embodiment battery-structure is generally indicated as 220. Battery-structure 220 is similar to battery-structure 120 except that battery-structure 220 includes a second row of battery compartments 32 and batteries 30 contained therein. In addition, battery-structure 220 includes an intermediate wall or walls 225 located between top wall 22 and bottom wall 24 and separating upper and lower battery compartments 32. It should be appreciated that as many rows of compartments 32 may be stacked together as is desired and yet still provide the desired characteristics of strength, stiffness, and lightweight in wings 14. It should be noted that battery-structure 220 may be molded as a single unit into the multiple rows depicted or single row battery-structures such as 20 and 120 may be layered together. The layered battery-structures may be held together with tape, an adhesive, or other means of binding the structures such as brackets or clips.

Figures 9, 10:
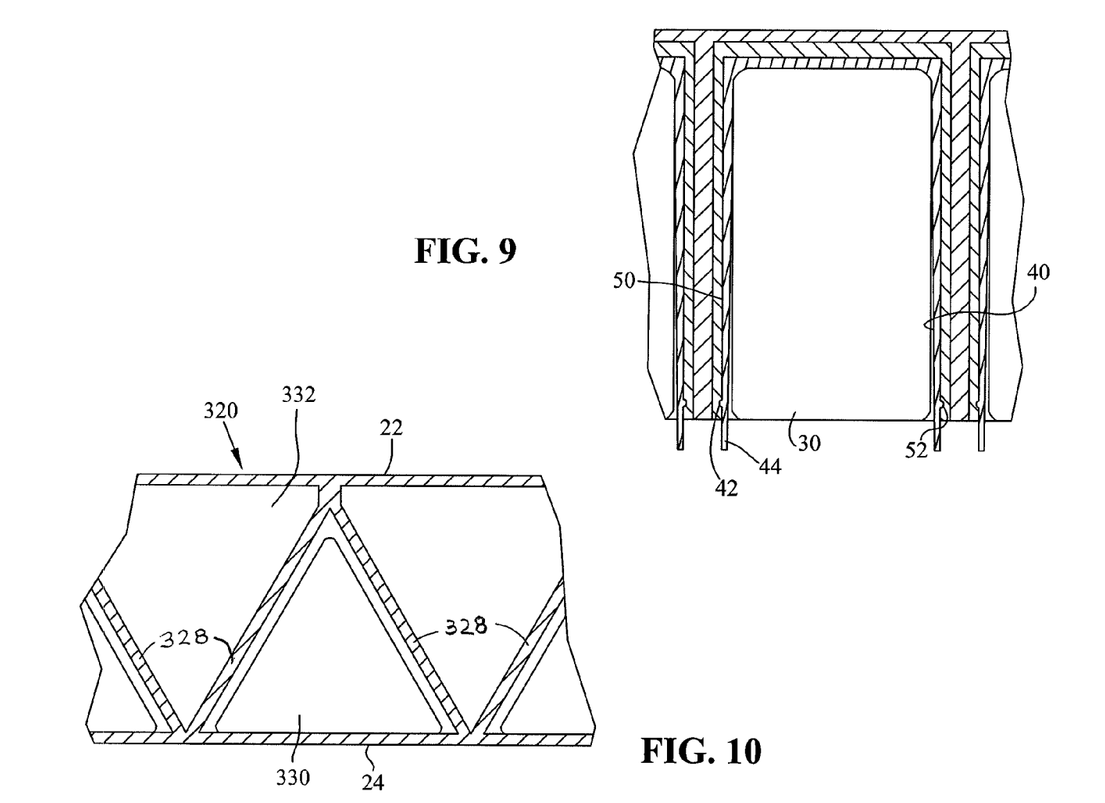
FIG. 9 is a cross sectional view through the battery-structure showing a plan view of the batteries and a locking configuration.
FIG. 10 is a cross sectional view of yet another alternate embodiment of a battery-structure having triangular shaped battery compartments.

Now referring to FIG. 9, one embodiment of an attachment mechanism for use in removably attaching the batteries is shown. In this embodiment, mounting clips 40 are shown wrapped around the sides and end of batteries 30. Mounting clips may be attached to batteries 30 by use of a compression fit, or may be adhered thereto by a tape or an adhesive. In the embodiment shown, mounting clips 40 have a generally U-shaped configuration and include projections or ridges 42 on the outer end thereof. It should be noted, as discussed more fully below, that the ends 44 of mounting clips 40 are configured to extend beyond batteries 30 and have a springing action to release the battery as discussed more fully below.

Also shown in FIG. 9 are interlocking mounts or receptacles 50 located in compartments 32 for interlocking with mounting clips 40 to retain batteries 30 in respective compartments 32. Interlocking mounts 50 have a generally U-shaped configuration and include a cavity or dimple 52 for receipt of projections 42 on mounting clips 40.

Now referring to FIG. 10, another alternate embodiment battery-structure is generally indicated as 320. Battery-structure 320 includes diagonally oriented web members 328 defining, in conjunction with top and bottom panels 22 and 24, triangular shaped battery receiving compartments 332 for holding triangular shaped batteries 330, or other shaped batteries as will fit therein. As should be appreciated, the diagonally oriented web members 332 may provide additional structural rigidity as is known for truss members. Other compartment and web shapes may be utilized that provide the required structural stability for the battery-structure.

Figure 11:
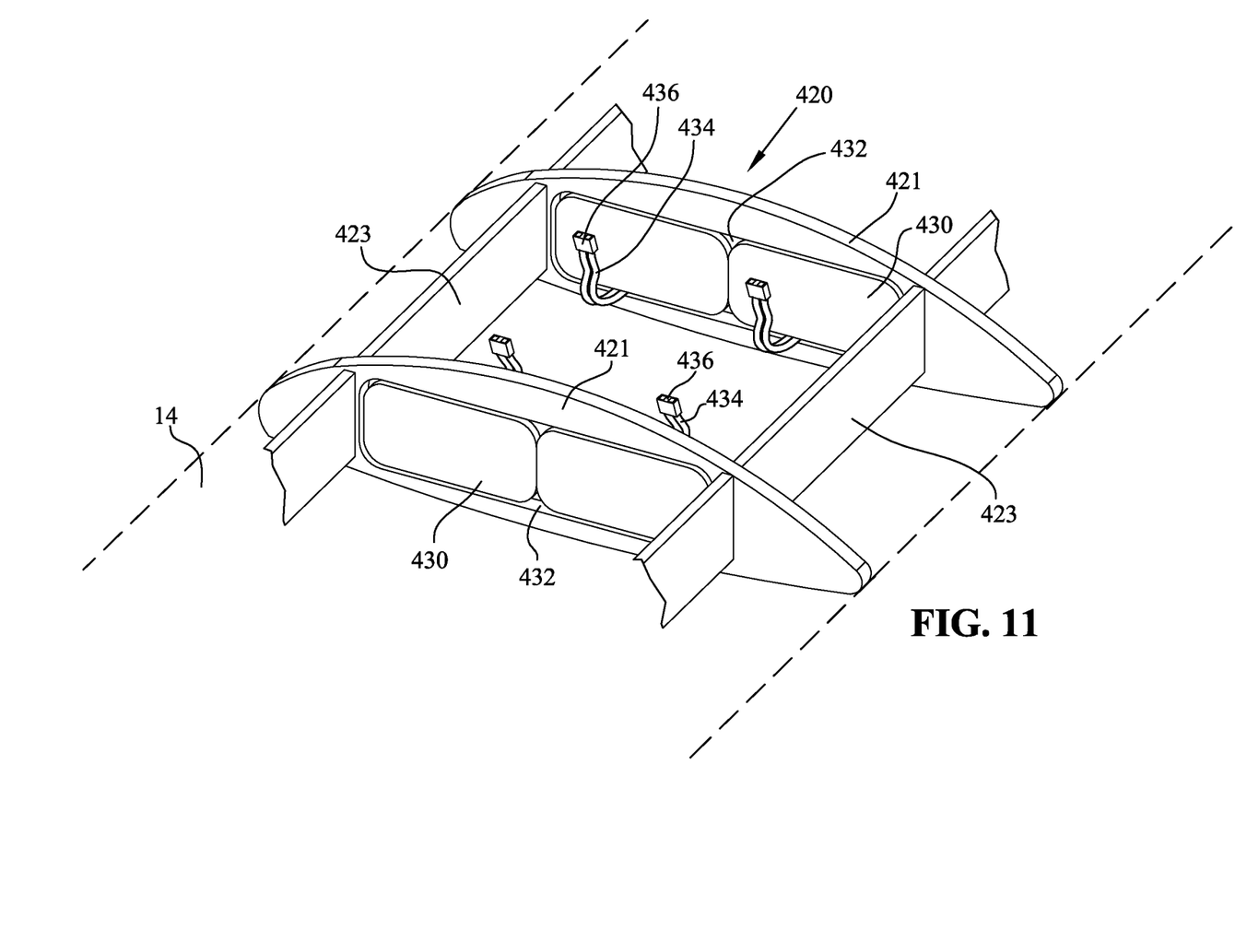
FIG. 11 is a perspective view of an airplane wing with yet another embodiment of a battery-structure.

Referring now to FIG. 11, an alternate battery-structure 420 is shown mounted in wing 14. Battery-structure 420 includes mounting panels 421, which may be considered to be wing rib assemblies that are oriented perpendicular to the axis of wing 14. Battery-structure 420 also includes struts 423 connecting spaced mounting panels 421, which may be considered to be wing spar assemblies. Mounting panels 421 also include batteries 430 mounted in battery compartments 432. The battery compartments 432 consist of openings through the mounting panels in the embodiment shown. Battery-structure 420 also includes electrical leads 434 and electrical connectors 436 attached to the electrical leads. Batteries may be held in compartments 432 using any of the methods previously discussed herein.

Figure 12:
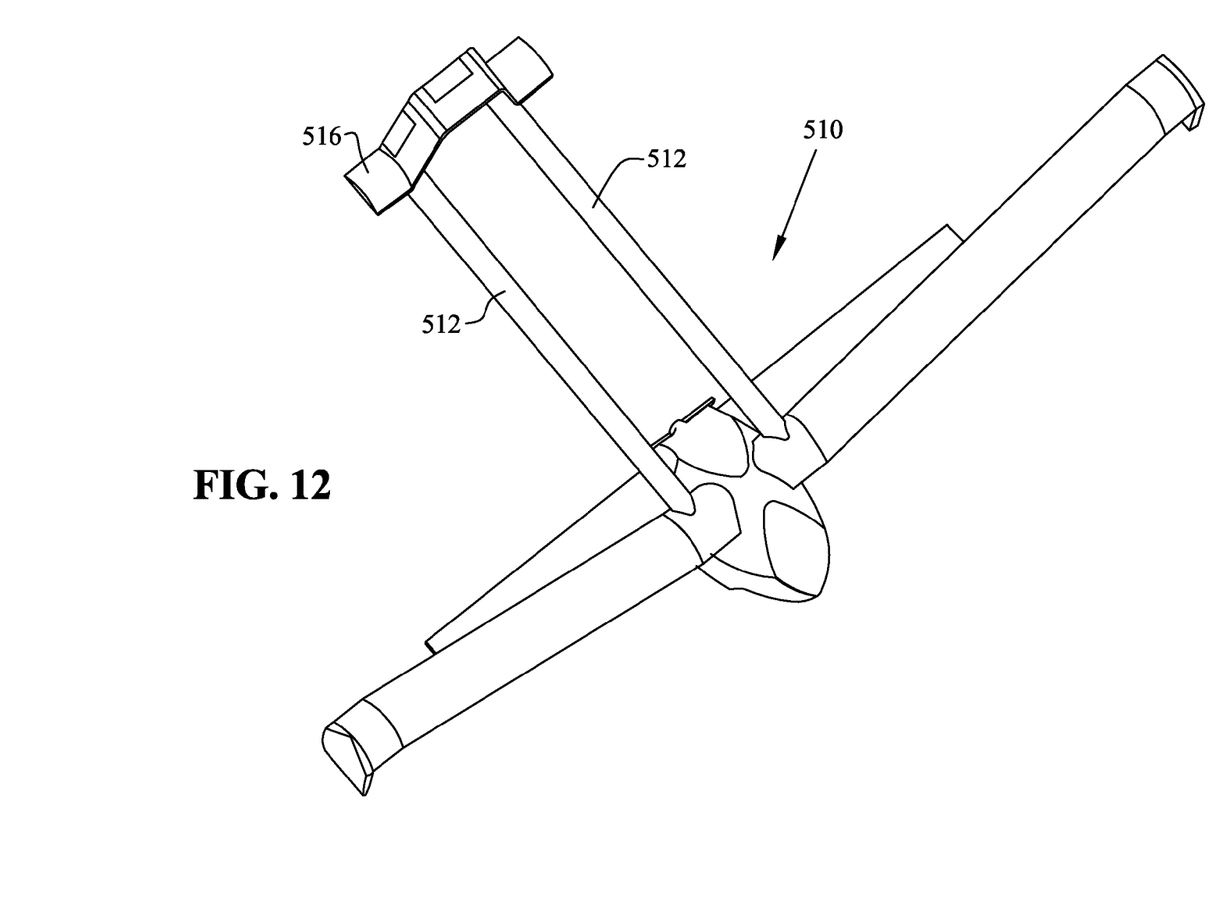
FIG. 12 is a perspective view of an aircraft having a battery-structure in a tail section thereof.
Figure 13:
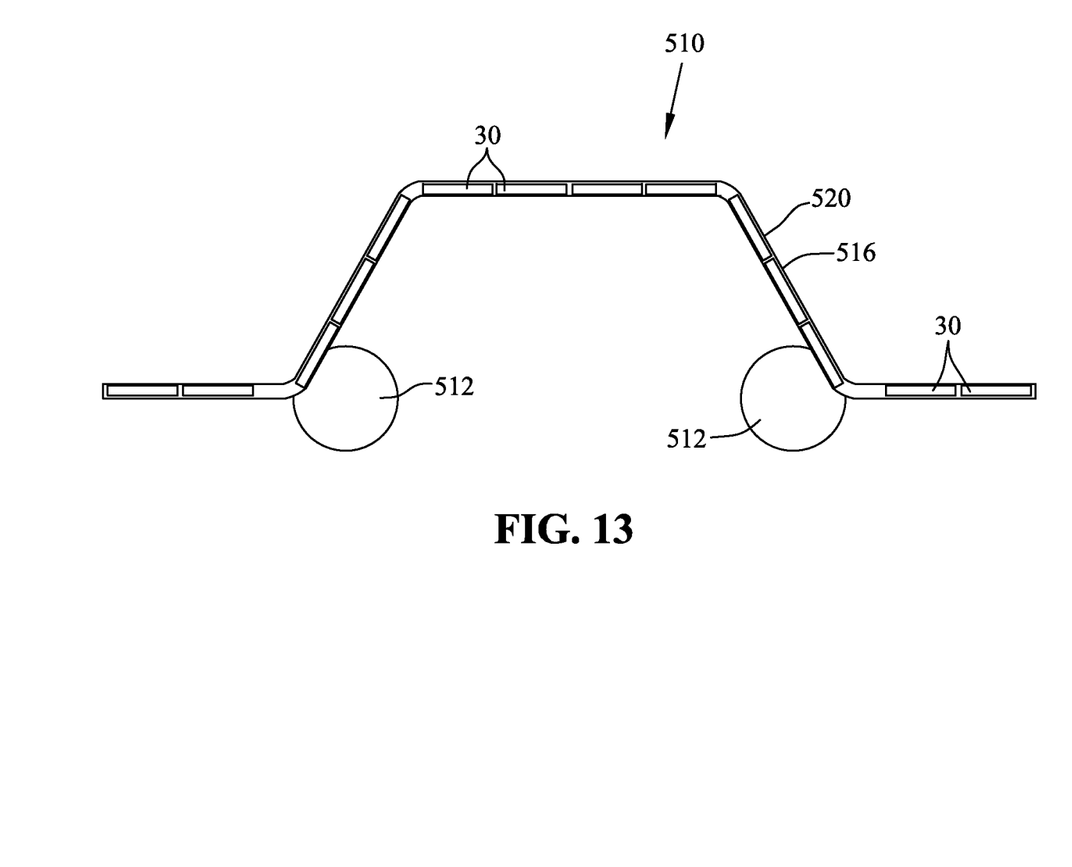
FIG. 13 is an cross sectional view of the tail section of the aircraft of FIG. 12 showing the battery-structure.

Now referring to FIGS. 12 and 13, an alternate embodiment aircraft or battery powered airplane is shown generally indicated as 510. In the embodiment depicted, aircraft 10 includes a dual fuselage or tail booms 512 and a modified tail section 516. As shown in FIG. 13, tail section 516 of aircraft 510 includes a battery-structure 520. Battery-structure 520 holds similar or alternate type batteries 30 as in the preceding battery-structures, and the batteries are mounted in suitable battery compartments configured similar to the preceding described battery compartments. In the embodiment shown, tail section 516 has a generally trapezoidal configuration; however, other tail configurations that provide suitable rigidity, weight, and flying characteristics may be employed.

As previously noted, battery-structures may be manufactured from any suitable material that provides weight, stiffness, and/or strength required. Of note, though, is that rectangular battery compartments 32 may not provide suitable desired strength and resistance to bend from external forces as are commonly encountered in an aircraft wing. Accordingly, sizing the battery compartments 32 to correspond with the size of batteries 30 can greatly enhance the structural integrity of the battery-structures and resistance to bending from external forces. In other words, if the batteries 30 are fixed snugly and tight into battery compartments 32, the rigidity of battery-structures is greatly enhanced. As previously noted, tape, fillers and/or adhesive may be used to assure that the batteries are mounted tight and snugly into battery compartments 32.

Alternately, the batteries may be mounted utilizing the mounting clips 40 and interlocking receptacles 50, as shown in FIG. 9. The arms of mounting clips 40 and in particular ends 44 are biased to spring outwardly so that when batteries 30 and mounting clips 40 are inserted into compartments 32, the projections 42 on mounting clips 40 are biased into cavities 52 of interlocking receptacles 50. This type of mount provides a means of securely mounting batteries 30 tightly in compartments 32, and also allows for quick replacement of the batteries. Batteries are removed by pushing spring ends 44 together, thereby releasing projections 42 from cavities 52. Batteries 30 would then readily slide out of compartments 32.

In use, the battery-structures disclosed not only provide a storage compartment for batteries for use in aircraft, and in particular for use in a remote controlled battery-powered aircraft, the configurations disclosed also enhance the structural strength and rigidity of the wings in which they are mounted, thereby possibly enabling weight reduction by requiring less fully structural members therein.

While the invention has been taught with specific reference to these embodiments, one skilled in the art will recognize that changes can be made in form and detail without departing from the spirit and scope of the invention. The described embodiments are to be considered, therefore, in all respects only as illustrative and not restrictive. For example, the structures disclosed above or alternate structures may be especially suited for satellites and spacecraft, and in particular, spacecraft or images with wings or solar receiving cells. It should also be appreciated that the subject invention can be used for the integration of sensors, electronics, antennae, wiring, battery, and actuating materials. As such, the scope of the invention is indicated by the following claims rather than by the description.

The invention claimed is:

1. A method for mounting batteries in a component, including the steps of:
   providing a battery-structure having a top panel, a bottom panel, a pair of side panels, and a plurality of web members connecting said top and bottom panels;
   mounting the battery structure to the component;
   providing a plurality of battery receiving compartments in the battery-structure as defined by said top panel, said bottom panel, said side panels, and said web member;
   mounting a plurality of batteries in the battery receiving compartments, each of said batteries having a top wall, a pair of sidewalls and a bottom wall; said batteries fitting tightly within said battery receiving compartments with each side wall of said batteries abutting side panels or web members of said battery structure, and at least one of said top wall or bottom wall of each battery abutting a respective top panel or bottom panel of said battery structure;

subjecting the battery-structure to an external force; and said batteries providing a resistance to deformation of said battery-structure and said battery-receiving compartments;

wherein the component is a wing of an aircraft.

2. The method of mounting batteries in the component as set forth in claim 1, wherein said battery receiving compartments have a rectangular configuration, and said batteries are received tightly between said web members to reinforce the rigidity of the battery structure.

3. The method of mounting batteries in the component as set forth in claim 2, including the step of providing a plurality of stacked rows of battery receiving compartments and an intermediate panel between each row, said intermediate panel extending in a horizontal plain along the inside of an aircraft wing.

4. The method of mounting batteries in the component as set forth in claim 2, including the step of mounting the battery structure in the wing of the aircraft such that said side panels and said web members run parallel to a vertical plane of symmetry of the aircraft, said top panel and said bottom panel extend in a horizontal plane along the inside of the wing of the aircraft and said battery receiving compartments are open on at least a front end or a back end of said battery structure for receiving said batteries.

5. The method of mounting batteries in the component as set forth in claim 1, further including the steps of providing mounting clips attached to the batteries and providing interlocking receptacles on the receiving compartments.

6. The method of mounting batteries in the component as set forth in claim 1, including the step of mounting the battery-structure within the wings of the aircraft and extending parallel to the wings.

7. The method of mounting batteries in the component as set forth in claim 6, further including a tail structure and a second-battery structure located in the tail structure.

8. The method of mounting batteries in the component as set forth in claim 7, wherein the tail structure has a trapezoidal configuration.

* * * * *